(12) United States Patent
Walia et al.

(10) Patent No.: US 8,709,316 B2
(45) Date of Patent: Apr. 29, 2014

(54) PROCESS FOR SHAPING POLYMERIC ARTICLES

(75) Inventors: Parvinder S. Walia, Midland, MI (US); Karl V. Jacob, Midland, MI (US); James D. Oelberg, Saginaw, MI (US); Nestor A. Vasquez, Shepherd, MI (US)

(73) Assignee: Dow Global Technologies LLC, Midland, MI (US)

( * ) Notice: Subject to any disclaimer, the term of this patent is extended or adjusted under 35 U.S.C. 154(b) by 243 days.

(21) Appl. No.: 12/867,867

(22) PCT Filed: Mar. 13, 2009

(86) PCT No.: PCT/US2009/037078
§ 371 (c)(1),
(2), (4) Date: Aug. 16, 2010

(87) PCT Pub. No.: WO2009/114761
PCT Pub. Date: Sep. 17, 2009

(65) Prior Publication Data
US 2011/0001265 A1 Jan. 6, 2011

Related U.S. Application Data

(60) Provisional application No. 61/036,692, filed on Mar. 14, 2008.

(51) Int. Cl.
*B29C 47/38* (2006.01)
(52) U.S. Cl.
USPC .................................................. 264/211.21
(58) Field of Classification Search
USPC .................................................. 264/211.21
See application file for complete search history.

(56) References Cited

U.S. PATENT DOCUMENTS

| | | | |
|---|---|---|---|
| 3,654,219 | A | 4/1972 | Boyer et al. |
| 3,682,443 | A | 8/1972 | Upmeier |
| 3,746,489 | A | 7/1973 | Rizzi et al. |
| 3,797,707 | A | 3/1974 | Jenike et al. |
| 4,251,646 | A | 2/1981 | Smith, Jr. |
| 4,286,883 | A | 9/1981 | Johanson |
| 4,663,103 | A | 5/1987 | McCullough et al. |
| 4,698,378 | A | 10/1987 | Wehrli et al. |
| 4,732,926 | A | 3/1988 | Faulkner |

(Continued)

FOREIGN PATENT DOCUMENTS

| | | |
|---|---|---|
| EP | 0444671 A | 9/1991 |
| EP | 0 472 949 A1 | 3/1992 |

(Continued)

OTHER PUBLICATIONS

International Search Report for PCT/US2009/037078, mailed Feb. 11, 2011.

(Continued)

*Primary Examiner* — Larry Thrower
(74) *Attorney, Agent, or Firm* — The Dobrusin Law Firm, P.C.

(57) ABSTRACT

A process (2) for manufacturing a shaped article (17), comprising the steps of: dry blending (8) a plurality of different particulated ingredients (11) to form a uniform particle blend; reblending the particle blend by substantially defining a mass flow in a discharge unit (19) including an insert (39, 60) and shaping the particle blend in a part shaping machine (15) to form the shaped article (17).

18 Claims, 6 Drawing Sheets

(56) References Cited

U.S. PATENT DOCUMENTS

| | | |
|---|---|---|
| 5,130,076 A | 7/1992 | Blatz et al. |
| 5,215,764 A | 6/1993 | Davis et al. |
| 5,559,099 A | 9/1996 | Wickham et al. |
| 6,102,562 A | 8/2000 | Bengtson |
| 6,111,206 A | 8/2000 | Maguire |
| 6,187,424 B1 | 2/2001 | Kjellqvist et al. |
| 6,254,956 B1 | 7/2001 | Kjellqvist et al. |
| 6,262,161 B1 | 7/2001 | Betso et al. |
| 6,297,301 B1 | 10/2001 | Erderly et al. |
| 6,329,454 B1 | 12/2001 | Krabbenborg |
| 6,403,691 B1 | 6/2002 | Zanka et al. |
| 6,441,081 B1 | 8/2002 | Sadatoshi et al. |
| 6,525,157 B2 | 2/2003 | Cozewith et al. |
| 6,734,253 B2 | 5/2004 | Krabbenborg et al. |
| 6,951,900 B2 | 10/2005 | Blanchard et al. |
| 7,004,739 B2 | 2/2006 | Thomson |
| 7,271,202 B2 | 9/2007 | Krabbenborg et al. |
| 7,732,521 B2 | 6/2010 | Wevers et al. |
| 2002/0061976 A1 | 5/2002 | Krabbenborg et al. |
| 2002/0121716 A1 | 9/2002 | Welsh et al. |
| 2003/0204017 A1 | 10/2003 | Stevens et al. |
| 2003/0212159 A1 | 11/2003 | Martinez et al. |
| 2004/0048967 A1 | 3/2004 | Tomomatsu |
| 2004/0171758 A1 | 9/2004 | Ellul et al. |
| 2005/0049346 A1 | 3/2005 | Blanchard et al. |
| 2005/0070673 A1 | 3/2005 | Novak |
| 2005/0087906 A1 | 4/2005 | Caretta et al. |
| 2005/0100754 A1 | 5/2005 | Moncla et al. |
| 2005/0116390 A1 | 6/2005 | Watson et al. |
| 2005/0156352 A1 | 7/2005 | Burkle et al. |
| 2005/0215737 A1 | 9/2005 | Dharmarajan et al. |
| 2005/0250890 A1 | 11/2005 | Chen et al. |
| 2007/0141323 A1 | 6/2007 | Wevers et al. |
| 2007/0141933 A1 | 6/2007 | Wevers et al. |
| 2007/0246862 A1* | 10/2007 | Jones et al. ............ 264/328.8 |
| 2008/0009586 A1 | 1/2008 | VanSumeren et al. |
| 2008/0045645 A1 | 2/2008 | Seliskar et al. |
| 2008/0169055 A1 | 7/2008 | Seliskar et al. |

FOREIGN PATENT DOCUMENTS

| | | |
|---|---|---|
| EP | 0987091 A1 | 3/2000 |
| EP | 958118 B1 | 4/2003 |
| EP | 1 498 173 A2 | 1/2005 |
| EP | 1 533 022 A2 | 5/2005 |
| JP | 57-008104 A | 1/1982 |
| JP | 57-179224 A | 11/1982 |
| JP | 60-031514 A | 2/1985 |
| JP | 9124857 A | 5/1997 |
| JP | 9-286050 A | 11/1997 |
| JP | 2002-192526 A | 7/2002 |
| JP | 2004-042416 A | 2/2004 |
| JP | 2004-168879 A | 6/2004 |
| JP | 2005-178146 A | 7/2005 |
| WO | 93-18900 A1 | 9/1993 |
| WO | 97-21528 A1 | 6/1997 |
| WO | 98-46672 A2 | 10/1998 |
| WO | 99-07785 A1 | 2/1999 |
| WO | 01-12708 A1 | 2/2001 |
| WO | 00-34027 A | 6/2001 |
| WO | 01-42344 A1 | 6/2001 |
| WO | 01-57120 A2 | 8/2001 |
| WO | 01-58988 A | 8/2001 |
| WO | 02-22731 A2 | 3/2002 |
| WO | 02-43943 A | 6/2002 |
| WO | 02/43943 A1 | 6/2002 |
| WO | 03-040201 A1 | 5/2003 |
| WO | 2004-009657 A1 | 1/2004 |
| WO | 2004-031292 A2 | 4/2004 |
| WO | 2004-056545 A1 | 7/2004 |
| WO | 2005/083721 A1 | 9/2005 |
| WO | 2005-105868 A | 11/2005 |
| WO | 2006-047376 A1 | 5/2006 |
| WO | 2007-024541 A2 | 3/2007 |
| WO | 2007-078536 A1 | 7/2007 |
| WO | 2007-078537 A1 | 7/2007 |
| WO | 2008-002841 A2 | 1/2008 |
| WO | 2008-002841 A3 | 1/2008 |

OTHER PUBLICATIONS

International Search Report for PCT/US2007/071902, mailed Dec. 18, 2007.

International Preliminary Report on Patentability for PCT/US2007/071902, mailed Sep. 5, 2008.

Internation Search Report for PCT/US2007/066778, mailed Apr. 7, 2007—corrected version.

Verbraak, C., et al, "Screw Design in Injection Molding," Polym. Eng. & Sci., vol. 29, No. 7, 1989, pp. 479-487.

Han, C.D., et al, "Morphology and Mechanical Properties of Injection Molded Specimens of Two-Phase Polymer Blends," Journal of Applied Polymer Science, vol. 21, 1977, pp. 353-370.

"EXACT Plastomers—High Performance Solutions for TPO Applications," ExxonMobil Technical Bulletin, May 2005.

Annex to the International Search Report from the European Patent Office for copending European Patent Application 09721068.6-2307, dated Feb. 7, 2012.

T.V. Nguyen et al. "Funnel flow in Hoppers," Journal of Applied Mechanics, v. 47, 729-735, 1980.

Office Action dated Jul. 12, 2013 (mailed Jul. 23, 2013); Japanese Appln. No. 2010-550886.

Office Action dated Nov. 27, 2013 (mailed Dec. 3, 2013); Japanese Appln. No. 2010-550886.

Translation of Chinese Office Action, Application No. 200980108908.1 dated Oct. 23, 2013.

European Notice Allowance, Application No. 09721068.6 dated Sep. 13, 2013.

* cited by examiner

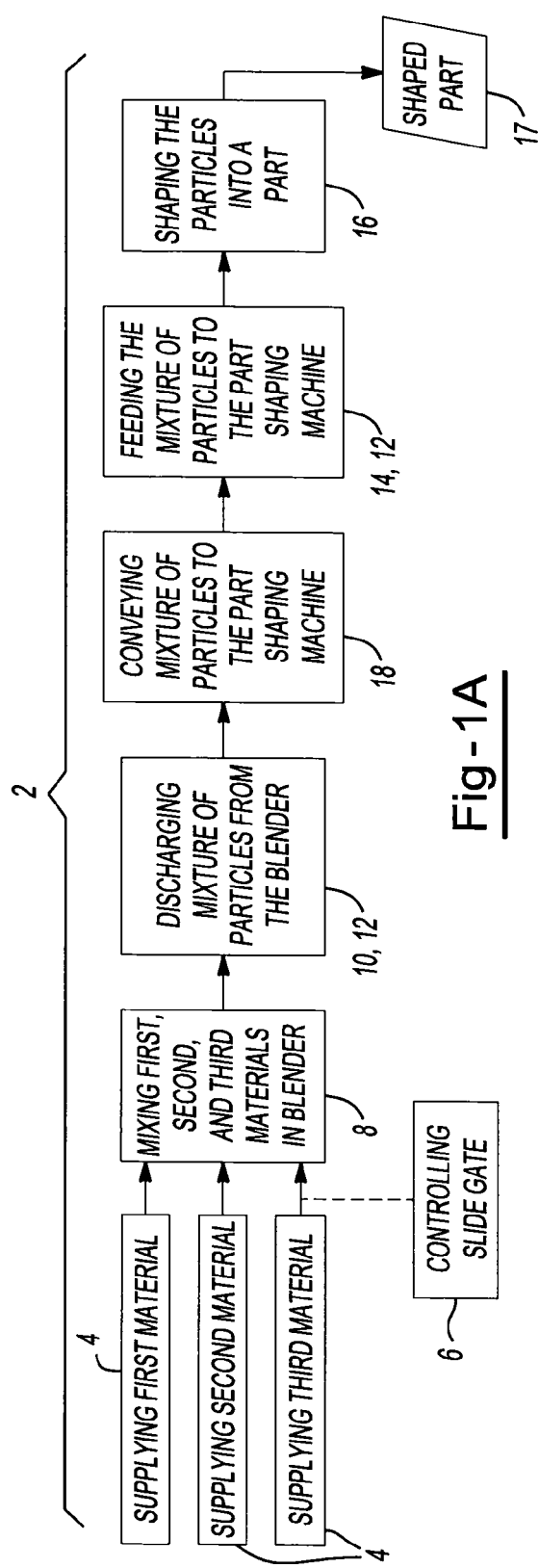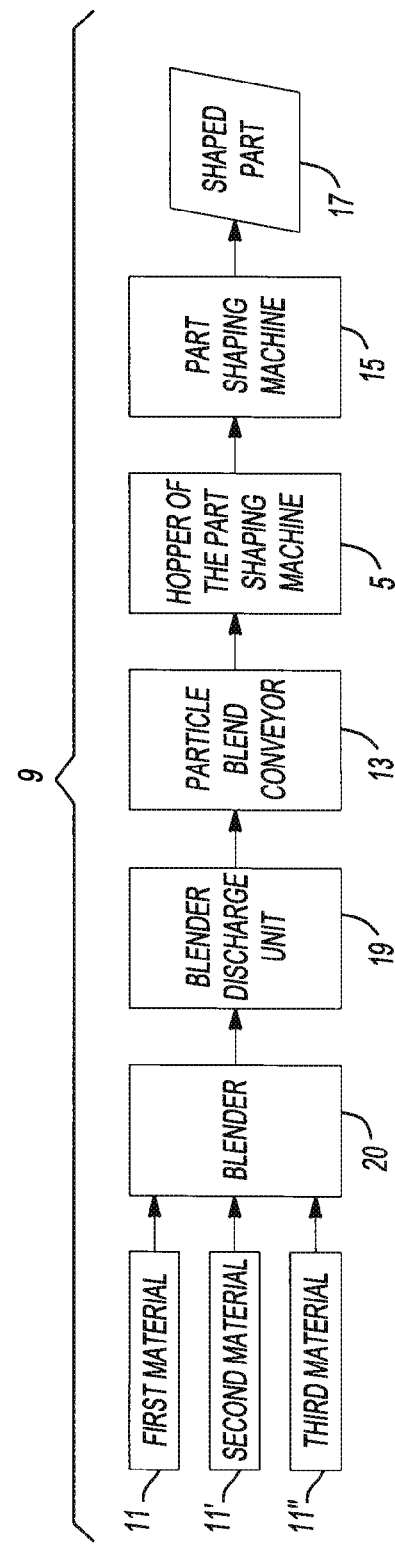

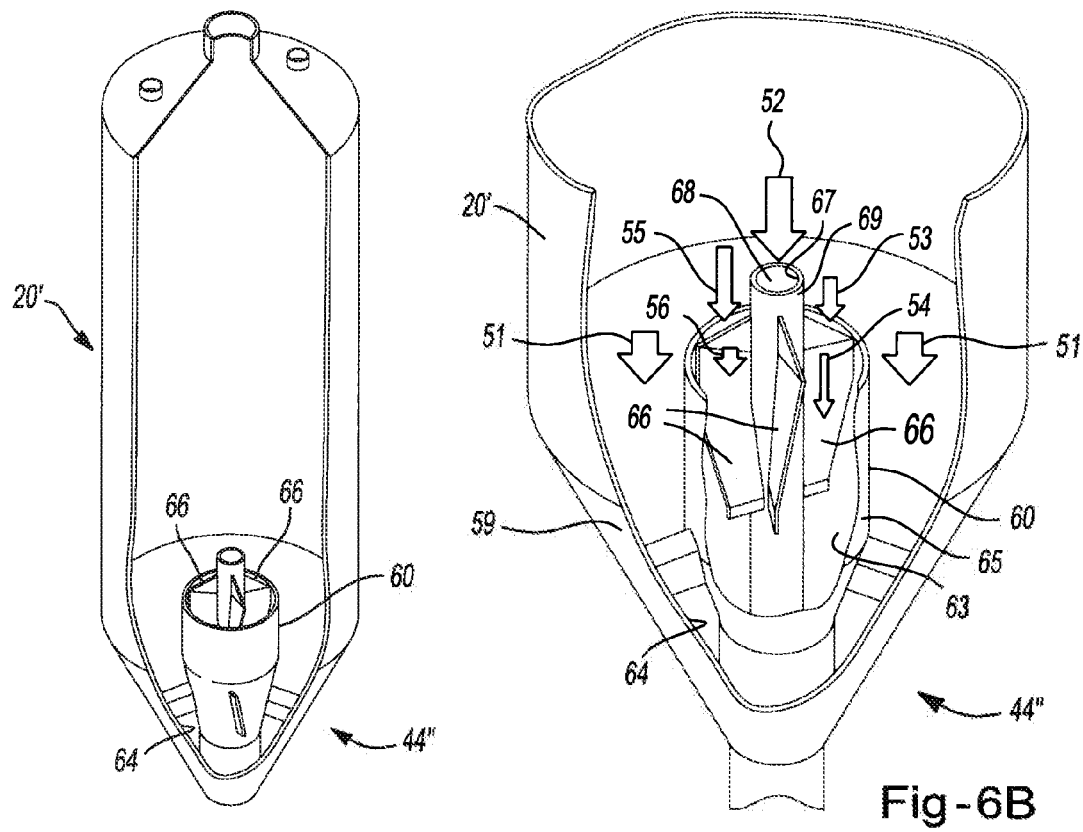
Fig-6A
Fig-6B
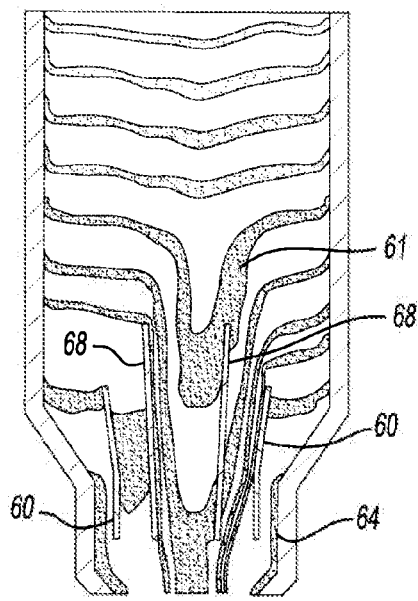
Fig-6C

PROCESS FOR SHAPING POLYMERIC ARTICLES

CLAIM OF PRIORITY

The present application claims the benefit of the filing date of PCT Patent Application Serial No. PCT/US2009/037078 (filed on Mar. 13, 2009 by Walia et al.), and U.S. Provisional Application No. 61/036,692 ("PROCESS FOR SHAPING POLYMERIC ARTICLES" filed Mar. 14, 2008 by Walia et. al.), the contents of which are both hereby incorporated by reference in their entirety.

FIELD OF THE INVENTION

The present invention relates to shaped thermoplastic articles and processes for making the same, and in one particular aspect to molded polyolefin articles that are compounded at the press prior to shaping.

BACKGROUND OF THE INVENTION

In the field of plastic blends, there continues to be a need for improved processes for compounding plastic materials. For example there is a need to reduce the number of processing steps for producing a fabricated part. In the field of thermoplastic polyolefins, for example, it remains attractive to have an effective material system that reduces the dependency upon pre-fabricating compounding steps, particularly those that subject the starting materials to heat history, that require energy consumption for processing, or both. In particular, it would be attractive for the improved process to provide fabricated parts with similar consistency and quality as current processes, which often rely upon a pre-fabricating compounding step. Such an improved process may have advantages including one or more of, the ability to rapidly change the composition of the blend material, to reduce thermal degradation of the plastic by eliminating at least one compounding step, to reduce waste or to reduce overall processing cost. One particularly attractive approach to "at-press" compounding is disclosed in U.S. patent application Ser. Nos. 11/736,342 and 11/821,706, which are both hereby expressly incorporated by reference for all purposes. In such "at-press" compounding, it is possible to avoid steps of pre-compounding together at elevated temperatures individual polymeric ingredients, and particularly avoiding a step of pre-compounding one or more polyolefins with each other or with elastomeric material such as a thermoplastic polyolefin.

One potential difficulty encountered in efforts to compound at-press is the result of the tendency for some materials to segregate due to differences in particle size, density, elasticity, electrical conductivity or other properties. One or more of the materials may also form agglomerations. Another potential source of difficulty may consequentially occur if one or more of the materials interfere with the dosing mechanisms, such as by interfering with a valve that controls the feeding of that material into a hopper or mixer. Notwithstanding, the advances recently seen in the art, there continues to be a need for additional improved processes to avoid one or more of these considerations.

Examples from the literature addressing the processes in this field include published U.S. Pat. Nos. 3,797,707; 4,286,883; 5,559,099; 6,951,900; and 6,403,691; EP Patent No. 958118 B1; PCT Application No. WO1997021528 A1; Troxel, T. G., "Modeling and scale-up of tumble blenders for highly segregating materials", AIChE Spring National Meeting, Conference Proceedings, Orlando, Fla., United States, Apr. 23-27, 2006; McGlinchey, D., et al, "Particle segregation in pneumatic conveying lines.", IMechE Conference Transactions, 2000; and Tang, P., et al, "Methods for Minimizing Segregation: A Review", Particulate Science and Technology, vol. 22, No. 4, 2004, pp. 321-337; all hereby incorporated by reference for all purposes: and U.S. Pat. No. 6,111,206.

SUMMARY OF THE INVENTION

In one aspect, the present invention is directed to a process for manufacturing a shaped article, comprising the steps of: dry blending a plurality of different particulated ingredients (e.g., a first material that includes a first polyolefin, a second material including an admixture of a particulated filler and a second polyolefin, a third material that includes an elastomer, or otherwise) to form a substantially uniform particle blend; reblending and substantially preventing segregation of the particle blend by flowing the particle blend through a discharge unit having an insert, wherein the flow inside the insert is characterized by mass flow and the flow outside the insert is characterized by mass flow; introducing the reblended particle blend into a screw and barrel assembly of a part shaping machine; melt blending the particulated ingredients in the screw and barrel assembly to form a melt blend, and shaping the melt blend in the part shaping machine to form the shaped article. The process is advantageously free of a step of melt blending the plurality of different particulated ingredients between the dry blending step and the step of introducing the reblended particle blend into the screw and barrel assembly of the part shaping machine. The shaped article typically has a mass greater than about 1 g.

It is contemplated that the process may have one or any combination of the following features: the plurality of different particulated ingredients includes a material (e.g., a first material) that includes a first polyolefin; the plurality of different particulated ingredients includes a material (e.g., a second material) including an admixture of a particulated filler and a second polyolefin; the plurality of different particulated ingredients includes a material (e.g., a third material) that includes an elastomer; the elastomer is a thermoplastic having a melting temperature or a glass transition temperature greater than about 40° C.; at least one of the materials (e.g., at least one of the first, second, or third materials) further includes i) an additive for reducing the aggregation of substantially like particles, ii) an antistat compound for reducing buildup of material along the wall of the blender, reducing inherent segregation of particles, or both, or iii) both i) and ii); at least one of the materials (e.g., at least one of the first, second, or third materials) includes an antistat compound that is hygroscopic; at least one of the materials (e.g., at least one of the first, second, or third materials) includes an antistat compound selected from the group consisting of a monoglyceride, an ethoxylated fatty acid amine, and a diethanolamide; the concentration of the antistat compound is less than about 5% based on the total weight of the antistat containing material; the process further comprises a step of pre-compounding at most two of the first material, the second material, and the third material prior to the dry blending step; the discharge unit (e.g., a blender discharge unit or a part shaping machine hopper) includes an outer structure having an inwardly and downwardly sloping interior surface forming a first angle with the vertical and the insert includes an inner structure supported within the outer structure and having an inwardly and downwardly sloping exterior surface forming a second angle with the vertical which is smaller than the first angle; the inwardly and downwardly sloping exterior surface of the outer structure extends to a first opening generally located at the bottom of the outer structure for discharging a first portion of the particle blend (e.g., a particle blend containing segregated like particles), and the inwardly and downwardly sloping exterior surface of the inner structure extends to a second opening generally located at the bottom of the inner structure discharging a second portion of the particle blend (e.g., a particle blend containing segregated like particles); at a horizontal plane through the discharge unit, a first average vertical mass flux, F1, is formed between the interior surface of the outer structure and the exterior surface of the inner structure, and a second average vertical mass flux, F2, is formed between the internal surface of the inner structure, wherein the ratio of F1 and F2 is from about 0.1 to about 10; the first angle between an annular inwardly and downwardly sloping exterior surface of the outer structure and the horizontal plane is greater than about 60 degrees; the insert includes a plurality of fins attached to the inner surface of the inner structure for defining the second mass flow that includes at least two regions within the insert having different mass fluxes, wherein the mass fluxes are measured on the same horizontal plane; the insert further includes a central structure configured to permit a central mass flow rate therethrough, the central structure longitudinally extending downward within the insert and having a generally constant transverse cross-section; the inwardly and downwardly sloping interior surface of the discharge unit (e.g., the blender discharge unit), the inwardly and downwardly sloping exterior surface of the insert, or both, is a cone having a frustoconical closed annular structure, a polyhedron having converging walls, or a combination of both; the process further comprises a step of controlling a slide-gate, having a valve insert for preventing one or more of the materials (e.g. one or more of the first, second, and third materials) from becoming accumulated in the slide-gate prior to the step of feeding to the blender; the valve insert is wedge-shaped or curve-shaped; the process further comprises a step of conveying the uniform particle blend from the blender to the part shaping machine; the blender is a gravimetric mixer, the part shaping machine is an injection molding machine; the process further includes a step of passing the uniform particle blend through a static mixer; the uniform particle blend comprises a first material including a first thermoplastic and a second material including an admixture of a particulated filler and a second thermoplastic; the first thermoplastic includes an elastomer, a polyolefin, or both; the second thermoplastic includes an elastomer, a polyolefin, or both; the first material is present at a concentration from about 30 to about 90 parts by weight based on the total weight of the uniform particle blend; the second material is present at a concentration from about 10 to about 50 parts by weight based on the total weight of the uniform particle blend; the uniform particle blend includes a total elastomer concentration greater than about 3 wt. % based on the total weight of the uniform particle blend; the uniform particle blend includes a total polyolefin (e.g., polypropylene) concentration greater than about 30 wt. % based on the total weight of the uniform particle blend; the process further includes a steps of individually feeding, from at least one supply source each to the blender i) about 30 to about 90 parts by weight of a first material that includes a first polyolefin, ii) up to about 50 parts by weight a second material including an admixture of a particulated filler, a second polyolefin, and an antistat agent having a glycerol monostearate, an ethoxylated fatty acid amine, a diethanolamides, or any combination thereof, and iii) about 3 to about 40 parts by weight of a third material that includes an elastomer; the insert is coaxially supported by the outer structure; the blender is a centralized blender and the process includes a step of conveying the uniform particle blend to a plurality of part shaping machines; the conveying step includes conveying the uniform particle blend through a generally closed tube having an exit opening at the reception area of the discharge unit, wherein the angle between the mean flow direction of the particle blend at the exit opening and the downward vertical direction is less than about 30°; or the conveying step includes passing the uniform particle blend through a distributor at the reception area of the discharge unit, wherein the distributor changes the average velocity of the uniform particle blend, the standard deviation of the velocity.

In another aspect, the present invention is directed to a system for forming a shaped article comprising: a blender in communication with separate sources of the first, second, and third materials; a discharge unit (e.g., a blender discharge unit, or a part shaping machine hopper) in communication with the blender wherein the discharge unit includes an outer structure having an inwardly and downwardly sloping interior surface forming a first angle with the vertical, and the discharge unit includes an insert having an inner structure supported within the outer structure and having an inwardly and downwardly sloping exterior surface forming a second angle with the vertical which is smaller than the first angle; and a part shaping machine in communication with the discharge unit; wherein the blender is configured for blending the first, second, and third materials to form a generally uniform particle blend, and the insert is configured for recombining (e.g., reblending) segregated like particles from the uniform particle blend by substantially defining a mass flow in the discharge unit.

It is contemplated that the system may have one or any combination of the following features: a separate source of i) a first material that includes a first polyolefin, ii) a second material that includes an admixture of a particulated filler, a second polyolefin and an antistat agent having a glycerol monostearate, an ethoxylated fatty acid amine, a diethanolamides, or any combination thereof, and iii) a third material that includes an elastomer; at least one slide-gate assembly configured for dosing one or more of the first, second, and third materials being received by the blender, wherein the at least one slide-gate assembly includes a valve having a valve insert that is configured to substantially prevent the blockage of at least one of the first, second, and third materials flowing through the slide-gate assembly; the blender includes an outer cone having a frustoconical closed annular inwardly and downwardly sloping interior surface forming a first angle with the vertical, the blender is configured for blending the first, second, and third materials to form a generally uniform particle blend; the insert is configured for recombining segregated like particles from the uniform particle blend by substantially defining a mass flow in the discharge unit; or insert further includes a plurality of fins that are attached to the inside of the inner structure so as to produce, at a horizontal plane, a first vertical mass flux between the interior surface of the outer structure and the exterior surface of the inner structure, and a plurality of different second vertical mass fluxes between the fins and the internal surface of the inner structure.

BRIEF DESCRIPTION OF THE DRAWINGS

FIG. 1A shows an illustrative flow diagram of process steps of one aspect of the present invention.

FIG. 1B shows an illustrative flow diagram of a system of one aspect of the present invention.

FIGS. 6A, 6B, and 6C shows a cross-section of another aspect of the present invention.

DETAILED DESCRIPTION OF THE INVENTION

With respect to a particular embodiment as shown in FIGS. 1A and 1B, the present invention provides a process for manufacturing a shaped article and particularly an article made from a polymeric compound. The process 2 may include an individually feeding step 4. The feeding step 4 typically includes feeding the ingredients of the polymeric compound, from their respective supply sources each 11, 11', 11", to a blender 20 or to a blender hopper. As used herein, "ingredient" connotes one or more ingredients or materials. Examples of reference ingredients used herein include, but are not limited to a first material, a second material, and a third material, though the use of additional or fewer materials are contemplated. The use of first, second, or third is thus for purposes of differentiating among or between materials and is not intended as limiting the scope of the invention.

In general, the process herein envisions that the polymeric compound includes ingredients from at least two supply sources, e.g., a source of a polymeric ingredient and a source of a second polymeric ingredient or a source of a filler or reinforcement. One particularly preferred approach is to employ at least three supply sources e.g., a source of a first polymer (e.g., a second thermoplastic), a source of a second polymer (e.g., a second thermoplastic), and a source of a filler or reinforcement (e.g., a talc masterbatch). In a particularly preferred embodiment, the ingredients are supplied from three sources, one for each of a first material that includes a first polyolefin, a second material including an admixture of a particulated filler, a thermoplastic (e.g., a second polyolefin), and optionally an antistat agent (such as a glycerol monostearate, an ethoxylated fatty acid amine, a diethanolamides, or any combination thereof), and a third material that includes an elastomer (e.g., a thermoplastic polyolefin).

Figure 2A:
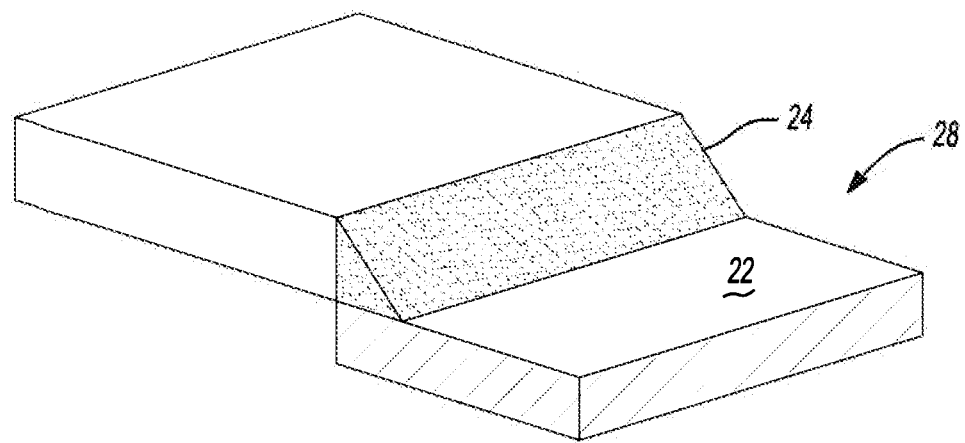
FIG. 2A-2B shows perspective views of an illustrative slide gate assembly in an closed position and an open position, respectively.
Figure 2B:
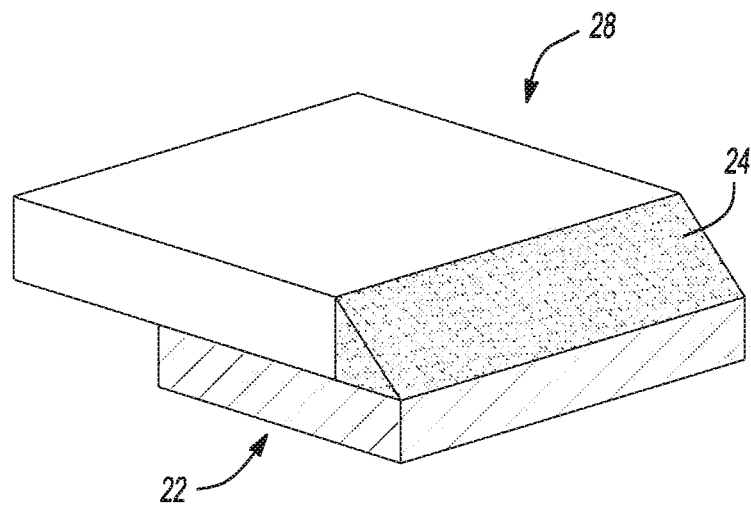

The process may include a step of controlling 6 at least one slide-gate assembly as shown in FIG. 1A. FIGS. 2A and 2B shows an illustrative slide-gate assembly 28 in a closed position and an open position, respectively. In one aspect, the slide gate assembly 28 may be located beneath at least one blender feeder for dosing at least one of ingredients (e.g., at least one of the first, second, and third materials). The slide-gate assembly 28 may include a slide gate 22 and a valve insert 24. The valve insert 24 may be wedge-shaped, curve-shaped, or otherwise configured for preventing one or more of the first, second, and third materials from accumulating (e.g., collecting, jamming, wedging, or otherwise) in the slide-gate assembly 28 (e.g., when the slide gate 28 moves between the closed position (FIG. 2A) and the open position (FIG. 2B)) prior to being received by the blender.

With reference to FIGS. 1A and 1B, it is contemplated that the process includes a dry blending step 8, during which individual particles (e.g., pellets) of the first, second and third materials are mixed in the blender 20 to form a substantially uniform particle blend, preferably without melting the materials (e.g., the maximum dry blend temperature is below either the peak melting temperature or the glass transition temperature of at least one of, preferably all of the first second, and third materials). Following the dry blending step 8 the process may further include a step of discharging 10 the uniform particle dry blend (i.e., the uniform particle blend), for example through a blender discharge unit 19. Preferably the uniform particle blend is not melt blended until it is heated in a screw and barrel of a part shaping machine 15 (e.g., at-press blending). It is appreciated that in one embodiment, the particle blend may include only two of the three materials, one material may include the polymer and the other material may include a filler or reinforcement (e.g., a talc masterbatch, a glass fiber concentrate, or both). It is appreciated that in another embodiment, the blend may include one or more additional ingredients such as a colorant, a regrind available from grinding of shaped parts, or otherwise as described herein. It is further appreciated that the blending step may be a batch process, a continuous process, or otherwise, or any combination thereof. Similarly, the feeding (e.g., dosing) step may be a batch process, a continuous process, or otherwise, and any combination thereof.

Figure 3:
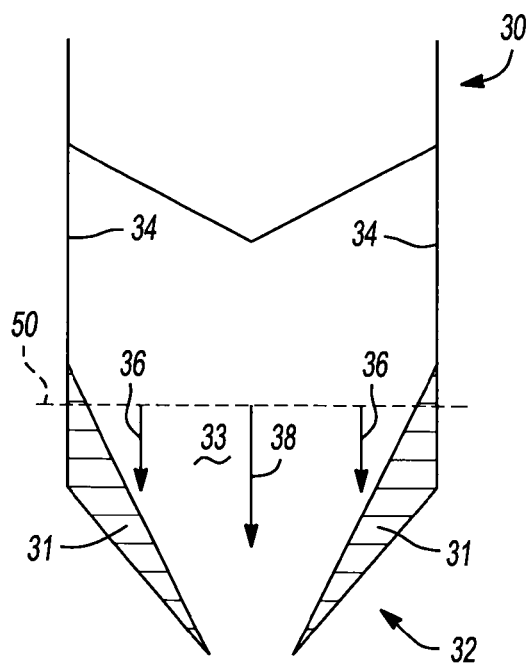
FIG. 3 shows an illustrative cross-section of a prior art embodiment.

By way of example, as shown in FIG. 3, a typical blender 30 is employed having a discharge unit 32 (e.g., a blender discharge unit 19, a shaping machine hopper 5, or otherwise) without an insert. Without being bound by theory, it is believed that typical blending (e.g., gravitational mixing, mechanical mixing, or otherwise, or any combination thereof) utilizing the apparatus of FIG. 3 and various materials (e.g., coarse, non-coarse, or otherwise), which may or may not have similar sizes, shapes, densities, elasticities, or otherwise, or any combination thereof, may result in a plurality of inner flow rates or fluxes. Upon discharge of the material blend from the blender, these inner flow rates or fluxes may cause some segregation of the various materials in the material blend. As one example, the discharge unit 32 has a mass flow characterized as a "funnel" type flow, such that the flow rate or the vertical mass flux (i.e., the local flow rate per unit area) of particles at a horizontal cross-section varies with the distance from the interior surface 34 of the discharge unit. A "funnel" type flow tends to prevent recombination of the various materials, tends to cause segregation of the various materials, or both. Accordingly, the funnel type flow tends to congregate the first particles (e.g., coarse particles), as shown by outer portions 31, towards the interior surfaces 34 to define a first flow rate and the second particles (e.g., fine particles) tend to congregate towards the central portion 33 to define the second flow rate, the first flow rate being generally smaller than the second flow rate. Along the horizontal plane 50, the particle blend flows at a first vertical mass flux 36 near the outer portion 31 and at a second vertical mass flux 38 towards the central portion 33, the first vertical mass flux 36 being generally smaller than the second vertical mass flux 38. It is contemplated that the congregated first particles of portions 31 may include "dead" flow or non-flow areas, which may further promote segregation of like particles or otherwise. The resulting funnel flow typically begins to separate like particles from the generally uniform (e.g., homogeneous) particle blend from the blending step thereby forming a nonuniform (e.g., heterogeneous) particle blend. For example, in one embodiment having a funnel flow, it is appreciated that one material (e.g., the fine material) generally discharges faster or first, such that the material that is initially discharged has a relatively high concentration of the fine material. Later, the discharge is a mixture which has a relatively low concentration of the one material (e.g., the fine material) and a relatively high concentration of another material (e.g., a coarse material). Thus, it can be appreciated that the funnel type flow typically results in a particle blend having varying composition and/or parts having varying composition.

Preferably, the process further includes a step of recombining (e.g., reblending) segregated (e.g., separated) like particles from the uniform particle blend (e.g., dry blend). The recombining step is achieved by providing an insert 39 in a discharge unit 44 (e.g., a blender discharge, a shaping machine hopper, or otherwise). In one aspect, the insert 39 desirably is configured for substantially reducing radial segregation (e.g., side to side) of the various different particles by defining at least one mass flow through the discharge unit 44. In "mass" type flow, there typically is no "dead" flow or no flow areas. As such, it is appreciated that the insert may be configured to substantially maintain the uniform particle blend through the discharge unit (i.e., to prevent or substantial reduce segregation 12), to permit effective recombination (e.g., reblending) of a potential segregation of like particles by imposing a mass flow within the discharge unit, or both.

Figure 4:
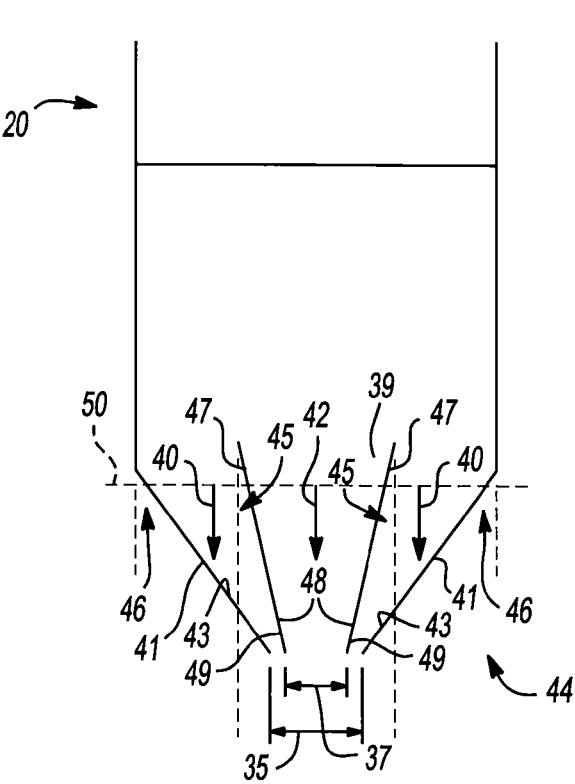
FIG. 4 shows an illustrative cross-section of another aspect of the present invention.
Figure 5:
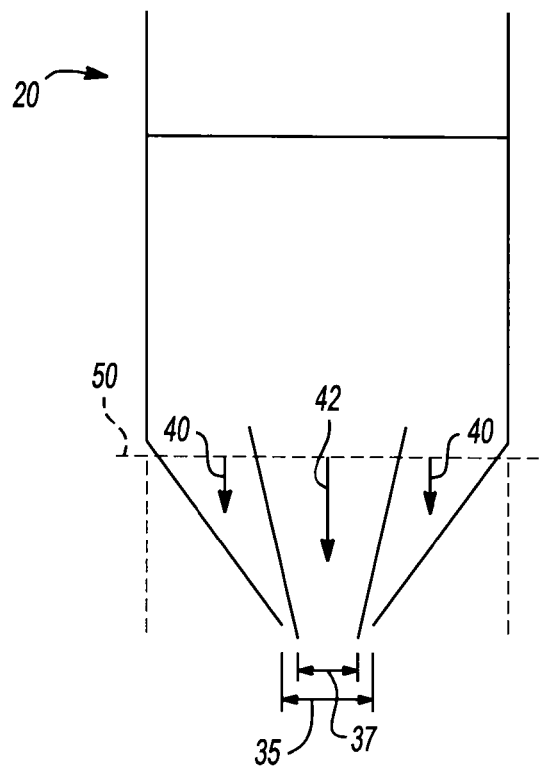
FIG. 5 shows an illustrative cross-section of another aspect of the present invention.

As shown in FIGS. 4-5, a discharge unit 44 (e.g., a blender discharge unit, a shaping machine hopper, or otherwise) is employed having an insert 39, such as an insert discussed in U.S. Pat. No. 3,797,707 (Jenike et al., issued on Mar. 19, 1974) and No. 4,286,883 (Johanson, issued on Sep. 1, 1981) which are incorporated by reference herein for all purposes. Without being bound by theory, it is believed that the interior surface 48, and exterior surface 47 of the insert 44 substantially reduces or eliminates the "funnel" flow caused by the discharging step (e.g., a blender discharging step or a step of discharging from the part shaping machine hopper to the screw and barrel assembly of the part shaping machine) in a similar discharge unit which is free of the insert. Further, it is believed that the insert substantially reduces or eliminates the segregation of particles (e.g., the segregation of the coarse particles from the fine particles). The insert may results in a flow of the uniform pellet blend which is characterized as "mass" type flow. For example, the flow inside the insert and outside the insert may be characterized by mass flow.

With respect to a particular embodiment as shown in FIGS. 4-5, it is further contemplated that the discharge unit 44 may include an outer structure 41 having a closed perimeter (e.g., annular or otherwise) with an inwardly and downwardly sloping interior surface 43 forming a first angle 46 with the vertical. The insert 39 may include an inner structure 49 supported (e.g., coaxially supported) within the outer structure 41 and having a closed perimeter (e.g., annular or otherwise) with an inwardly and downwardly sloping interior surface 48 and exterior surface 47 forming a second angle 45 with the vertical. Preferably, the second angle of the inner structure is smaller than the first angle. For example, in one embodiment, the first angle between an annular inwardly and downwardly sloping exterior surface of the outer structure and the vertical may be less than about 30 degrees (i.e., the angle between the exterior surface and the horizontal plane may be greater than about 60 degrees). It is appreciated that the sloping surfaces of the outer structure, the inner structure, or both may generally form the shape of a cone (e.g., frustoconical cone), a converging polyhedral (e.g., tetrahedral, pyramid, or otherwise), or otherwise.

In more particular detail, as seen in one specific example, FIG. 4 shows a discharge unit 44 (e.g., attached to a blender 20) having a first opening 35 that is generally planar with the second opening 37 of the insert 39. In this example, the outer vertical mass flux 40 is generally similar to the inner vertical mass flux 42 (e.g., the outer mass flow rate is generally similar to the inner mass flow rate), as illustrated in FIG. 4 along the horizontal plane 50. The flow in the discharge unit (e.g., both inside and outside of the insert) is characterized by "mass" type flow. In another specific example, FIG. 5 shows a discharge unit 44' having the second opening 37 generally non-planar with the first opening 35 such that the second opening 37 is displaced below the plane of the first opening 35. It is appreciated that the second opening 37 thus extends through the first opening 35. In this example, the size (e.g., radii) of the openings and angles of the insert and discharge unit (i.e., the first and second angles) are the same as in FIG. 4. The positioning of the second opening 37 with respect to the first opening 35 produces an outer vertical mass flux 40 that is generally smaller than the inner vertical mass flux 42 (e.g., the outer mass flow rate is generally smaller than the inner mass flow rate) as illustrated in FIG. 5 along a horizontal plane 50.

As illustrated in the examples above, at a given horizontal plane, the average vertical mass flux rate outside the insert (i.e., between the interior surface of the outer structure and the exterior surface of the inner structure), $F_1$, may be the same or different than the average vertical mass flux rate inside the insert (i.e., between the internal surface of the inner structure), $F_2$. Typically the ratio of $F_1/F_2$ is from about 0.1 to about 10, more typically from about 0.2 to about 5, and most typically from about 0.25 to about 4 (e.g., from about 0.4 to about 2.5). However, higher and lower ratios of the fluxes may be used. As illustrated above, the ratio of $F_1/F_2$ may be about 1 (e.g., from about 0.8 to about 1.25).

The cross-sectional area of the first opening, $A_1$, is the area between the outer surface of the inner structure 47 and the inner surface 43 of the outer structure at the first opening 35. The cross-sectional area of the second opening, $A_2$, is the area bounded by the inner surface 48 of the inner structure at the second opening 37. It will be appreciated that the relative flow rates through the first opening and through the second opening will vary with the areas $A_1$ and $A_2$. For example, the ratio of the flow rate through the first opening to the flow rate through the second opening will increase as the ratio $A_1/A_2$ increases. Typically, the ratio of $A_1/A_2$ is from about 0.1 to about 10, more typically from about 0.2 to about 5, and most typically from about 0.4 to about 2.5. However, higher and lower ratios of $A_1/A_2$ may be used. The ratio $A_1/A_2$ may be about 1 (e.g., from about 0.8 to about 1.25).

With respect to FIGS. 6A, 6B, and 6C, another embodiment of the present invention is shown, by providing a discharge unit 44" (e.g., a blender discharge, a shaping machine hopper, or otherwise) having a modified insert 60. Similar to the inserts described above, the modified insert 60 may include a closed perimeter having an inwardly and downwardly sloping interior 63 and exterior 65 surfaces. It is appreciated that the modified insert 60 may be supported (e.g., coaxially supported), attached, or otherwise to the interior surface 64 of the discharge unit 44". FIG. 6A illustrates a discharge unit 44" that is part of a blender 20' or a hopper. The modified insert may further include one or more fins 66, a central structure 67, or a combination of both. The fins 46 may be attached to the interior surface 63 of the modified insert 60, to the central structure 67 (when included), or a combination of both. The central structure 67 may be generally a longitudinally (e.g., vertically) extending structure. In one aspect, the central structure 67 may include a constant profile, though not required. In another aspect, the central structure 67 may be a hollow structure for permitting particle flow (e.g., in one particular embodiment as shown in FIG. 6B by the vertical mass flux 52) therethrough, though not required. In one specific embodiment as shown in FIG. 6B, the central structure 67 is a hollow structure having fins 46 attached thereto.

The fins 66 may include preferably smooth surfaces, though not required. The fins 66 may include a generally flat surface, a generally curved surface, a twist, or otherwise, or any combination thereof. The fins 66 may be similarly spaced apart or not. The fins may have similar lengths, widths, radius or otherwise or they may be different. As such, the fins 66 may be designed to create a variety of vertical mass fluxes or local mass flow rates (e.g., in one particular embodiment as shown in FIG. 6B by mass flow rates or vertical mass fluxes 53, 54, 55, and 56, which are different). It is appreciated that an outer vertical mass flow rate or vertical mass flux (e.g., in one particular embodiment as shown in FIG. 6B by mass flow rate or vertical mass flux 51) may be formed between the interior surface 64 of the outer structure 60 and the exterior surface 65 of the modified insert 60. It is further appreciated that the vertical mass fluxes depicted in FIG. 6B (e.g., vertical mass fluxes 51, 52, 53, 54, 55, and 56) are further shown in FIG. 6C, which shows a cross-section of the discharge unit 44" having the modified insert 60. FIG. 6C illustrates the various mass fluxes 61 of the blended material as the material travels between the interior surface 64 of the outer structure and the exterior surface 65 of the modified insert 60, between the interior surface 63 of the modified insert 60 and the exterior surface 69 of the central structure 67, and between the interior surface 68 of the central structure 67.

In one aspect, the modified insert 60 may be configured for substantially reducing radial segregation (e.g. side to side) of the various different particles by defining at least one mass type flow through the discharge unit 44" (e.g., blender discharge, shaping machine hopper, or otherwise) as discussed herein. In another aspect, it is appreciated that the modified insert may be configured for substantially reducing axial segregation (e.g., top to bottom) of the various different particles by defining one or vertical more mass fluxes, one or more mass flow rates, or both, through the discharge unit 44". For example, in processes resulting in blend segregation (such as may be caused by funnel type flow, static electricity, a vortex type flow, and the like) it may be desirable to have a plurality of fluxes to reduce the temporal variation in the composition. This may be particularly attractive when the variation the concentrations of the ingredients results in variations in one or more properties. As such, by providing a plurality of vertical mass fluxes as shown in FIGS. 6B and 6C, a recombination (e.g. a reblending) of particles may be achieved thereby reducing the variance in the properties of shaped parts made at different times and/or in properties of the like particulated ingredients axially.

As illustrated in FIGS. 1A and 1B, the process further includes a feeding step 14 of feeding the uniform particle blend to a discharge unit, such as a hopper 5 (preferably including an insert or a modified insert) and into the part shaping machine 15 (e.g., by introducing the particle blend into the screw and barrel assembly of the part shaping machine), a shaping step 16 of shaping the particle blend in the shaping machine to form the shaped article 17 (e.g., via a shaping tool such as a mold, a die, or otherwise), or a combination of both.

The step of discharging from the blender and the step of feeding to the part shaping machine step may be achieved through the same apparatus or step (e.g., the blender discharge and the hopper of the part shaping machine are integrated together or are the same components), or through different apparatuses or steps (e.g., the blender discharge and the part shaping machine hopper are not integrated or are different components) as discussed herein. The process may include a conveying step 18 that includes conveying at least one of the first material, the second material, the third material, or any combination thereof, between one or more of the steps discussed herein (e.g., from at least one material supply source to the blender, from the blender discharge to the hopper, or otherwise).

The present invention further includes a part shaping machine 15 that may be configured for accepting a blend of solid polymeric particles containing different materials. Examples of one or more features of the part shaping machine include, but are not limited to, uses thermal energy, mechanical energy, or both to melt the polymer; provides shear energy, or otherwise to mix (e.g., homogenize) the different materials; shapes the molten polymer into a shaped article, or otherwise, or any combination thereof. Examples of a part shaping machine may include, but is not limited to, an injection molding machine, a blow molding machine, a sheet or film extrusion machine, a profile extrusion machine or otherwise. Additionally, the part shaping machine may be coupled with another part shaping machine to produce a part using multiple materials (e.g. co-injection molding, co-extrusion machines, or otherwise, or any combination thereof.

Typically a part shaping machine may be used in fabricating plastic parts that may include a screw and barrel assembly. The screw and barrel assembly may include one or more of the following features: has a length to diameter ratio greater than about 15:1, back pressure of at least about 100 psi that may be applied to the first, second and third materials in the screw and barrel assembly, a screw speed of about 25 to about 250 rpm that may be employed in the screw and barrel assembly, a temperature of about 180 to about 270° C., or any combination thereof. A preferred process employs a temperature in the screw and barrel assembly at which at least one, more preferably all of the polymeric materials (e.g., the first, second, and third materials) in the uniform pellet blend are in a melt state.

As discussed in U.S. patent application Ser. No. 11/736,342 (Jones et al. filed on Apr. 17, 2007) and No. 11/821,706 (Wevers et al. filed on Jun. 25, 2007), which are both hereby expressly incorporated by reference, the screw of the screw and barrel assembly may be adapted to provide dispersive and distributive mixing. For example, it may includes a plurality of both in-flow channels and out-flow channels, a mixing flight that includes at least one undercut for providing dispersive mixing, at least one bypass channel for providing distributive mixing, or other commonly known means for dispersive mixing and distributive mixing. It also anticipated that the screw may be adapted with a combination of the above means for providing dispersive and distributive mixing.

The shaped part produced by the part shaping machine may be of any size or shape. Preferably the shaped part has a mass greater than 1 g, preferably greater than 3 g, and most preferably greater than 10 g. The shaped part preferably is not a pellet or other part that is intended to be melt processed in an additional screw and barrel assembly.

The step of conveying 13 the particle blend from the material supply sources to the blender, from the blender to the part shaping machine, or otherwise, when present, will occur over a suitable conveying distance. Furthermore, the conveying distance may be typically less than about 100 meters, though possibly more, more typically less than about 50 meters, and most typically less than about 10 meters. In one embodiment of the invention, the conveying distance preferably should be less than 8 meters, more preferably less than 5 meters, and most preferably, less than 3 meters.

The step of conveying 13 the particle blend from the blender to the part shaping machine may involve a step of delivering (e.g., feeding) the particle blend to multiple part shaping machines. That is, a single system supplies dry blended ingredients to a plurality of part shaping machines.

The conveying step may include conveying the uniform particle blend using a particle conveyor 13. For example, the conveying step may include a step of transporting a particle blend (i.e., the uniform particle blend) through a conveying tube having an exit opening into a blender or hopper (e.g., a blender or hopper including a discharge unit having an insert or modified insert), such that the particle blend flows into the reception area of the blender or hopper. The average flow direction of the particle blend as it exits the tube (i.e., at the exit opening of the tube) preferably is in a generally downward direction. For example, the angle between the average flow direction and the downward vertical direction may be less than about 30°, preferably less than about 10°, more preferably less than about 5°, and most preferably less than about 2°. The flow of the particle blend leaving the conveying tube may be substantially free of tangential flow, such that essentially no vortex is created. For example, the conveying tube may be connected to the lid of a hopper (e.g., on the top of the lid), preferably at or near the center of the lid.

The conveying may be by any suitable means, including but not limited to gravity flow, pneumatic conveying, or a combination thereof. Preferably the conveying conditions are such that the top layer of material in the hopper is substantially free of saltation. For example, the conveying conditions may include a relatively low flow rate, a relatively low vacuum, or both.

Figure 7:
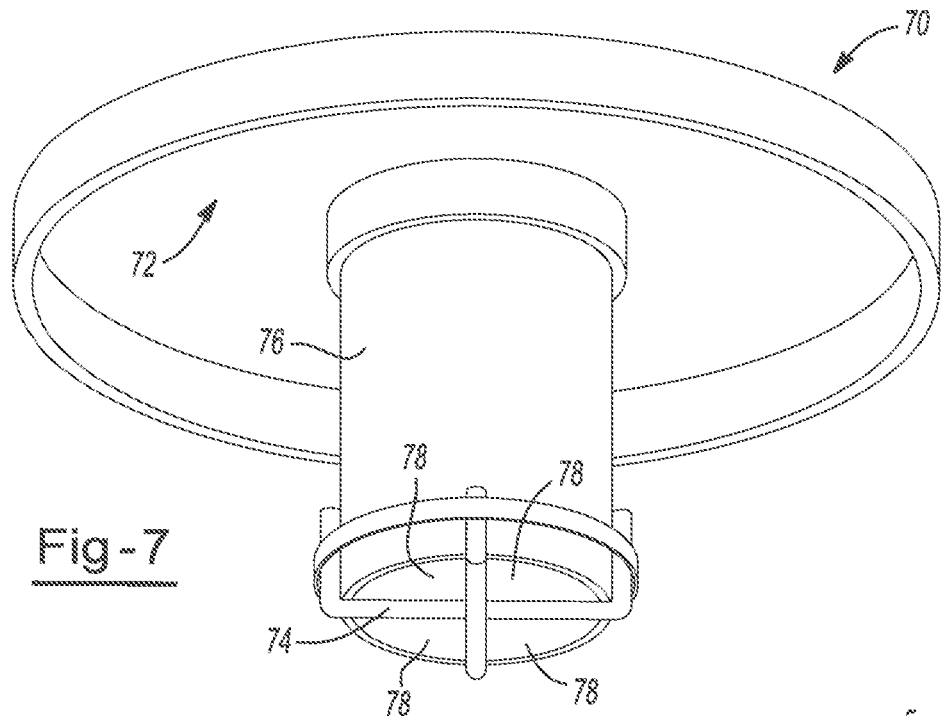
FIG. 7 shows an illustrative distributor.

Upon entering the reception area of the blender or hopper, the pellet blend may pass through or onto a distributor or other device for generally distributing the flow of the particles more evenly. The distributor may change the average velocity of the uniform particle blend, the standard deviation of the velocity, or both. For example, the distributor may cause the average velocity (e.g., the downward component of the velocity) to decrease and/or the outwardly radial direction of the velocity to increase. The distributor may result in a top surface of the pellet blend in the hopper that is generally horizontal (e.g., having an angle less 20°, preferably less than about 12°, more preferably less than about 8°, and most preferably less than about 4°. The distributor may be attached to the hopper, a lid of the hopper, or to the conveying tube. In general, the distributor will be located in the conveying tube, at the end of the conveying tube or below the exit opening of the conveying tube. Suitable distributors include distributors having a solid surface such as a flat generally horizontal plate or disk, or others having a generally upwardly and inwardly sloping surface such as a upwardly pointing cone or pyramid, and the like. Other suitable distributors include those having a plurality of openings (e.g., a mesh), such that less than 35% (preferably less than 28%, more preferably less than 15%) of the particles pass through any single opening. With reference to FIG. 7, the distributor 74 may be attached to the hopper lid 70. For example, the distributor may be connected to a central inlet 76 to the hopper, such as one on the bottom of the hopper lid 72. The distributor illustrated in FIG. 7 has four openings 78, however, more or few openings may be used (as discussed above, the distributor may have no openings, such as a flat horizontal plate or disk placed below the inlet). A distributor having openings preferably includes at least three openings, more preferably at least 4 openings. The distributor openings 78 may be generally similar in size and shape as illustrated in FIG. 7, or they may vary in size and shape.

The conveying tube may be made of any suitable material. Preferably the conveying tube is made of an electrically conductive material (e.g., a conductive metal) or includes a means of conducting electricity (e.g., using a metallic wire or mesh, preferably in the interior of the conveying tube).

In one aspect of the invention, it may be desirable to have low variability of the dosing of the first material, the second material, and the third material. One measure of the variability in dosing is the coefficient of variation, which is defined as the quotient obtained by dividing the standard deviation of the dosing rate by the mean of the dosing rate; where the standard deviation and mean are obtained by sampling the dosing rate. In one specific example, the coefficient of variation of the dosing rate of one or more of the materials into the blender should be less than 5%, and preferably less than 3%.

It is further contemplated that in one embodiment of the invention, the particle blend may be fed directly from the blender into the part shaping machine. Preferably, this step of directly feeding the particle blend into the part shaping machine may be achieved without the use of a conveying step.

A preferred process herein may be characterized as being free of a step for pre-compounding (i.e. melt blending) together the plurality of ingredients (e.g., the first, second and third materials) prior to feeding the particle blend into the reception point (e.g., the reception point of the hopper) of the part shaping machine. However, it is further appreciated, that the process may include a step of pre-compounding some, but not all of the ingredients (e.g., at most two of the first material, the second material, and the third material).

It is contemplated that the present invention may further include introducing into the part shaping machine 15 one or more additives. The additive may be included in at least one of the first material, second material and third material or as one or more additional materials. Without limitation, the additive may reduce or even substantially eliminate agglomeration, segregation, or both, of at least one of the plurality of different particulated ingredients.

For example, in one preferred embodiment of the invention, one of the materials, preferably the second material, i.e. the admixture of a particulate filler and a second polyolefin, may additionally include at least one antistatic chemical. The antistatic component is preferably an internal antistat, and may be ionic (e.g. cationic or anionic), nonionic, or a mixture of ionic and nonionic antistatic chemicals. In one preferred embodiment, the antistatic chemicals may be nonionic. In one preferred embodiment, effective nonionic antistatic chemicals may be hygroscopic, sufficiently small that they are capable of migrating to the surface, or a combination of both. After migrating to the surface, the hydrophilic section of the antistatic chemical may hydrogen bond to atmospheric moisture, thereby possibly forming a thin coating of water on the surface. It is believed that this coating of water typically provides the antistatic properties.

Examples of nonionic antistatic chemicals commonly used in polyolefins include, but are not limited to monoglycerides, ethoxylated fatty acid amines, diethanolamides, or otherwise, or any combination thereof. Monoglycerides are monoesters which may be typically formed by the reaction of glycerol and a fatty acid.

A general formulation for an illustrative monoglyceride is:

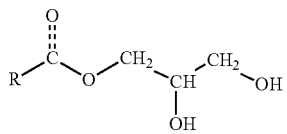

where R is an alkyl or an aryl group. Typically R contains at least about 10 carbon atoms, and preferably R contains from about 12 to about 22 carbon atoms. In one specific example, the monoglyceride is glycerol monostearate, where R is primarily $CH_3(CH_2)_{16}$. An exemplary diethanolamide is diethanol lauramide.

A structure of one illustrative ethoxylated fatty acid amine is given by:

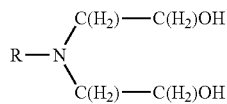

where R is an alkyl or an aryl group. Typically R contains at least about 10 carbon atoms, and preferably R contains from about 12 to about 22 carbon atoms.

A structure of one illustrative diethanolamide is given by:

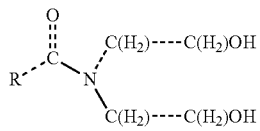

where R is an alkyl or an aryl group. Typically R contains at least about 10 carbon atoms, and preferably R contains from about 12 to about 22 carbon atoms.

Although the use of antistats is well known in the field of polymers, they are primarily used to impart a specific antistatic feature in the finished product. In the present case, the antistat is used to reduce the segregation of particles prior to fabricating, e.g. injection molding, the part.

If employed in the second material, the concentration of the antistatic chemical may be less than about 5% by weight, based on the total weight of second material. For example, the concentration of the antistatic chemical may range from about 0.1% to about 2.5%, and preferably from about 0.5% to about 2.0% based on the total weight of the ingredient (e.g., of the first material, the second material, or the third material).

Another aspect of the current invention is directed at the ability to achieve a level of mixing, consistency, or both that may be equivalent to compounded thermoplastic polyolefins (TPOs). For example, TPOs are typically blends of a) first polyolefin (e.g., polypropylene or otherwise) and b) a second polyolefin (e.g. an elastomer or otherwise). TPOs may further include additives such as fillers (e.g. talc, or otherwise), mold release agents, antioxidants, UV stabilizers, heat stabilizers, process aids, or otherwise, or any combination thereof. All of these ingredients may be dry mixed (i.e. mixed in the solid state), prior to reception in the part shaping machine. In the prior art, the first, second and third materials are either all compounded in the melt state prior to adding into the part shaping machine, or alternatively, they are added into the part shaping machine as a mixture of particles which may become inhomogeneous.

The first polyolefin may include polypropylene, or otherwise. The second polyolefin may include the first polyolefin, one or more other polyolefins, or a combination of both. In one preferred embodiment, the second material includes a polypropylene (e.g., polypropylene of the first material), an elastomer (e.g. elastomer of the third material), or a combination thereof.

Exemplary TPO compositions are disclosed in U.S. patent application Ser. Nos. 11/736,342 and 11/821,706, and in U.S. Pat. No. 5,576,374 which are all incorporated herein by reference.

The first polyolefin typically is relatively stiff. As such, the first polyolefin may include or consists essentially of (e.g., consist of at least 70% wt. %, more preferably at least 90 wt. %, and most preferably at least 95 wt. % based on the total weight of the first polyolefin) a thermoplastic having a flexural modulus (as measured by 2% secant modulus tested according to ASTM D-790) greater than about 200 MPa, preferably greater than about 400 MPa, more preferably greater than about 600 MPa, and most preferably greater than about 700 MPa. The first polyolefin may include or consists essentially of a thermoplastic having a flexural modulus less than about 1800 MPa, preferably less than about 1400 MPa. The first polyolefin may include a polypropylene homopolymer (e.g., isotactic polypropylene), a polypropylene copolymer (e.g. random polypropylene copolymer, polypropylene impact copolymer), or any combination. The first material will typically represent greater than 20 wt %, more particularly greater than 40 wt %, and more specifically about 45 to about 90 wt % (even still more specifically about 45 to about 80 wt % of the total blend weight.

Turning next to the second material, it typically will include an admixture of particulated filler and a second thermoplastic polymer (e.g., a second polyolefin). While any of a number of art disclosed fillers may be employed (e.g., mica, calcium carbonate, clays, silica, titanium dioxide, wood), a preferred filler is talc (e.g., one that consists essentially of $3MgO.4SiO_2.H_2O$). The filler may have any suitable median particle size, e.g. from about 0.01 to 10 microns. The filler will typically represent less than 85 wt %, and more particularly less than about 75 wt % of the total weight of the second material. Furthermore, the filler will typically represent about 2 to about 30 wt %, and more particularly about 5 to about 20 wt % of the total blend weight.

The elastomer of the third material may include one or more of any of a number of elastomers known in the art for providing improved impact resistance to the polypropylene. Examples of elastomers include but are not limited to ethylene-propylene rubber, EPDM rubber, ethylene-alpha olefin copolymers (e.g., ENGAGE® polyolefin elastomers), linear ethylene copolymers or interpolymers (also known as "LEPs") and substantially linear ethylene copolymers or interpolymers (also known as "SLEPs"). The elastomer of the third material preferably is a thermoplastic having a melting temperature or glass transition temperature greater than about, 40° C., preferably greater than about 50° C. (as measured by differential scanning calorimetry at a heating rate of about 10° C./min after a thermal history of cooling from the melt at a rate of about 10° C./min). The melt index of the third material may be about 0.5 to about 500 dg/min when tested according to ASTM D1238 at 190° C. with a load of 2.16 kg. the elastomer of the third material typically will have a flexural modulus (tested according to ASTM D790, 2% secant modulus) less than the flexural modulus of the first polyolefin. Preferably the elastomer of the third material has a flexural modulus less than about 150 MPa, more preferably less than about 100 MPa, even more preferably less than about 60 MPa, and most preferably less than about 30 MPa. The elastomer of the third material may have a flexural modulus greater than about 1 MPa, preferably greater than about 2 MPa, more preferably greater than about 4 MPa, and most preferably greater than about 8 MPa.

The elastomer will typically represent less than about 80 wt % of the total particle blend weight, though possibly more. More particularly, the elastomer will typically represent less than about 50 wt %, and most particularly less than about 40 wt % of the total blend weight. For example, the elastomer may be present in the range from about 10 to about 30 wt % of the total blend weight. The total concentration of polyolefin and elastomer in the particle blend may be greater than about 55 wt. %, preferably greater than 65 wt. %, more preferably greater than about 70 wt. %, and most preferably greater than about 80 wt. % (e.g., greater than about 90 wt. %) based on the total weigh of the particle blend.

It is further appreciated that one or more additional materials may also be blended with one or more of the first, second and third materials. Examples of additional materials may include, but are not limited to, additional polyolefins, additional elastomers, colorants, regrind material, additives, additive masterbatches, or otherwise, or any combination thereof.

Again referring to FIG. 1B, the present invention may further provide various systems 9 for manufacturing a shaped article. One system includes separate sources 11, 11', 11" of a first material that includes a first polyolefin, a second material that includes an admixture of a particulated filler and a second polyolefin, and a third material that includes an elastomer. It is contemplated that system further includes a blender 20 that employs an outer structure (e.g., cone such a frustoconical cone, converging polyhedral such as a pyramid, a tetrahedral or otherwise) having closed perimeter that incorporates an inwardly and downwardly sloping interior surface that forms a first angle with the vertical, and blender discharge. The blender typically includes a blending means such as paddles, fins, or otherwise means known by those skilled in the art for blending a plurality of particles of the first, second, and third material to form a generally uniform blend. The system may further include an insert located in the blender discharge unit 19, in a feeder (e.g., a hopper 5) to the shaping machine, or a combination of both. The insert includes an inner structure coaxially supported within the outer structure and having a closed perimeter that incorporates an inwardly and downwardly sloping exterior surface that forms a second angle with the vertical. It is appreciated that the first angle of the outer structure may be larger than the second angle of the inner structure, though not required. It is appreciated that the insert may be configured to substantially maintain the uniform particle blend post blending step (e.g., through the discharge unit. Optionally, or as an alternative, the insert may be configured to permit effective recombination (e.g., reblending) of a potential segregation of like particles by imposing a mass flow within the discharge unit. Preferably, the substantially maintaining the uniform particle blend step, the recombination step, or both may be achieved by way of one or more mass flow rates so as to reduce or substantially eliminate radial segregation, axial segregation, or both of like particles through the discharge unit. The system may also include a part shaping machine 15 configured for shaping the uniform particle blend into a shaped article 17, the part shaping machine may be in communication with the blender through the blender discharge unit 19, the hopper of the shaping machine, or a combination of both. It is contemplated that the system may further include a means for conveying 13 the individual materials, the blended material, or a combination of both to and from the respective components of the system.

In one aspect of the invention, the second material may include an admixture of a particulated filler, a second polyolefin, and an antistat agent having a glycerol monostearate, an ethoxylated fatty acid amine, a diethanolamide, or any combination thereof.

It is further contemplated that the system may include at least one slide-gate assembly for dosing one or more of the different particulated ingredients. In one aspect, the material being dosed in being fed to the blender. When included, the slide-gate assembly may include a valve having a valve insert (e.g., wedge-shaped, curve-shaped, or otherwise) that is configured to substantially prevent the aggregation of one or more particles. The aggregation of particles may induce jamming of the slide-gate such that the slide-gate may be propped to an open position, thereby causing the misfeed of one or more of the first, second, and third materials through the slide-gate assembly.

It is yet further contemplated that the present invention may also be utilized in a centralized blending environment. This environment may include two or more sources of supply (e.g., ingredients) that are fed to one or more blenders (e.g., large scale blenders, or otherwise) having a discharge unit with an insert. As discussed herein, the insert may be configured for recombining segregated like particles from a uniform particle blend, (by way of a blender), by substantially defining a mass flow in the discharge unit, preferably the discharge unit of the blender. Typically, smaller scale blenders may be employed at the feeder (e.g., hopper) of a shaping machine as discussed herein. It is believed that in applications utilizing several part shaping machines, the incorporation of a smaller scale blender with each part shaping machine may be not be cost effective, particularly when a large number of part shaping machines are employed in shaping articles using compositions with similar ingredients. By employing a centralized blending process, a master batch of ingredients that may be common to several applications may be blended using a larger scale blender that includes a discharge unit having an insert. In doing so, centralized blending may be capable of reducing segregation of uniform particle mixture over long conveying distances. Optionally, with a good reception system (e.g., feeder, or hopper) and the insert technology described herein, it is appreciated that re-mixing at the reception point may be utilized.

Some of the key performance characteristics of TPOs include tensile modulus, impact strength, heat distortion temperature, density, and shrinkage. Tensile modulus measurements are per ASTM D 638, notched Izod impact strength measurements are per ISO 180/5A, instrumented dart impact (IDI) energy measurements are per ASTM D 3763-86, heat distortion temperature measurements are per ASTM D 648, density measurements are per ASTM D792, and shrink measurements are per ASTM D 955. Improvements in the consistency of the process can be demonstrated by a reduction in the standard deviation of any of the above properties.

Additional test methods for evaluating the consistency of the blend in the finished part include ash level determination and part weight measurements. The ash level is measured by heating a 2-4 gram sample removed from the finished part and heating to 650° C., thereby burning of the organic compounds, and leaving the inorganic residue. The ash level is defined as the percent by weight of the material remaining. The part weight is obtained simply by measuring the mass of the part on a scale. Improvements in the consistency of the process can also be demonstrated by a reduction in the standard deviation of the ash level and/or a reduction in the standard deviation of the part weight.

EXAMPLES

Particles of polypropylene, ENGAGE® DA10 polyolefin elastomer (ethylene-octene copolymer having a density of 0.87), a talc masterbatch, and a colorant are blended in a gravimetric blender. The talc masterbatch contains 60.0% talc, less than 5% additives, and the remainder polypropylene. The concentration of the ENGAGE® DA10 in the particle blend is 16%, the concentration of the colorant is 2%. Trials are run with the polypropylene concentration fixed at various points between 67%-71%, and the talc masterbatch fixed at various points between 11%-15%. Particle blend is transferred to the hopper of an injection molding machine and then shaped into a bumper fascia.

Example 1

In the first example the particle blending process is improved by adding 1.5 wt % glycerol monostearate to the talc masterbatch. The standard deviation of the ash level of the injection molded bumper fascia is reduced from 0.50% to 0.37%.

Example 2

In the second example, the blend segregation in the hopper of the injection molding machine is reduced by the addition of a BINSERT® at the reception point of the injection molding machine. The improvements from EX. 1 are also used. The standard deviation of the ash level is further reduced from 0.37% to 0.19%.

Example 3

In the third example, the distance between the blender and the hopper of the injection molding machine is reduced to about 3.7 m. The material is conveyed from the blender to the injection molding machine by pneumatic conveying, using a flowing gas (commonly air) to move the material in a solid state through a pipe, or tube. If long conveying distances are required based on the plant layout (e.g. if one blender supplies material to multiple injection molding machines), then it may be advantageous to use a hopper insert (e.g. COMBIFLOW® or a BINSERT® modified with fins) in the injection molding machine hopper that provides multiple mass flow rates and effectively remixes the material. Such an insert may also reduce the variation in the part (e.g. coefficient of variation of the ash level, part weight, and impact strength) due to dosing variations.

Example 4

In the fourth example, a slide-gate used in the valve for dosing an elastomer (Engage DA10), fails to fully open when the elastomer becomes wedged between the moving gate and the stationary wall of the valve. A wedge-shaped insert is placed on the wall of the valve to prevent the elastomer particles (e.g., pellets) from becoming wedged when the slide-gate is opened. This insert may greatly reduce the coefficient of variation of the elastomer concentration in the blend.

Example 5

Figure 8:
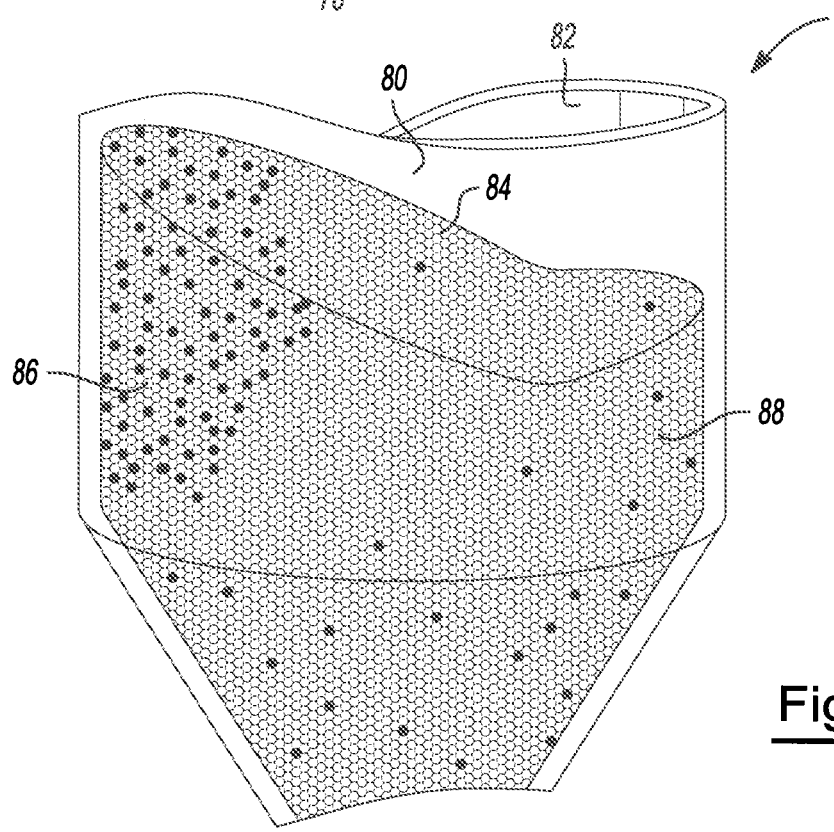
FIG. 8 shows an illustrative hopper including a plurality of particulated ingredients in the hopper.

The particle blend of example 1 is conveyed to a clear hopper using a conveyor tube that is connected to the side of the hopper lid, such that the particle blend enters tangentially. The conveyor tube is formed of a thermoplastic elastomer and has a copper wire for controlling static electricity. A relatively high vacuum (producing an air flow rate of about 5600 ft/min) is used for conveying the particle blend. A vortex is formed in the hopper. When the hopper is about 75% filled, the vacuum is turned off. The particle blend in the receiving area 80 of the hopper 5 is illustrated in FIG. 8. The top layer of particles 84 in the hopper is at an angle (with the horizontal plane) of about 30° and segregation of particles is visually observed, such that a first region 86 has a relatively low concentration of the masterbatch particles (dark colored particles) and a second region 88 has a relatively high concentration of masterbatch particles. There is substantially no particles attached to the inner vertical wall of the hopper 82, such as by static charge.

Example 6

Figure 9:
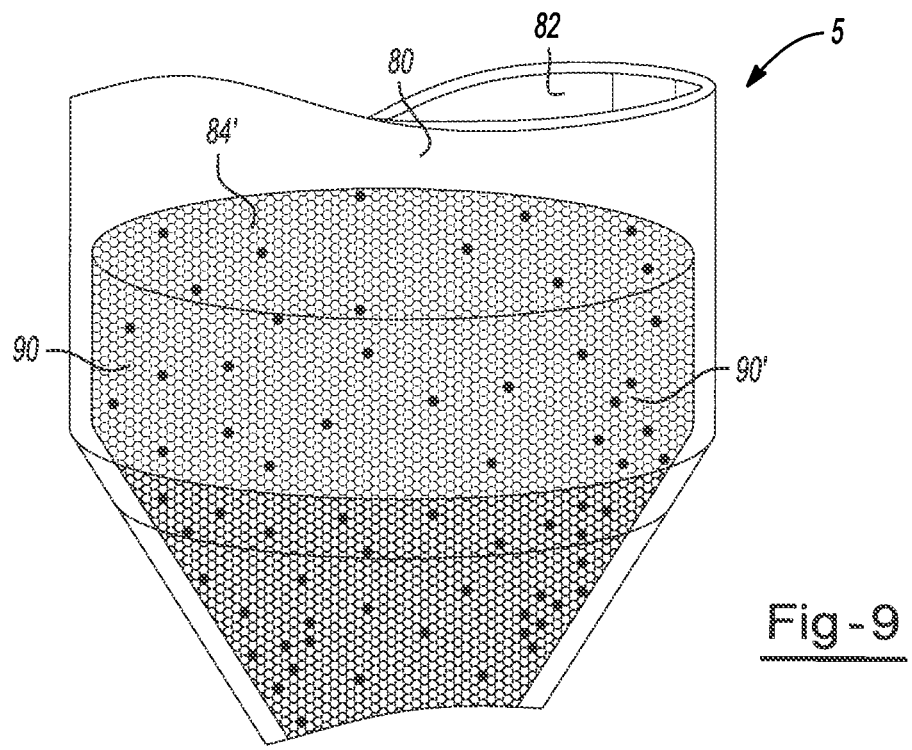
FIG. 9 shows an illustrative hopper including a plurality of particulated ingredients in the hopper.

The particle blend of example 1 is conveyed to a clear hopper using a conveyor tube that is connected to the top center of a hopper lid such that the particles blend enters in a downward vertical direction. The conveyor tube is formed of a thermoplastic elastomer and has a copper wire for controlling static electricity. A distributor is placed below the exit opening of the conveyor tube. A relatively low vacuum (producing an air flow rate of about 4500 ft/min) is used for conveying the particle blend. No vortex is formed when conveying the particle blend. When the hopper is about 75% filled, the vacuum is turned off. The particle blend in the receiving area 80 of the hopper 5 is illustrated in FIG. 9. The top layer of particles 84' in the hopper is nearly flat (i.e., horizontal). No segregation of particles is visually observed and the concentration of the masterbatch particles is essentially constant in the various regions (e.g., regions 90, 90'). There is substantially no particles attached to the inner vertical wall of the hopper 82, such as by static charge.

Example 7

Figure 10:
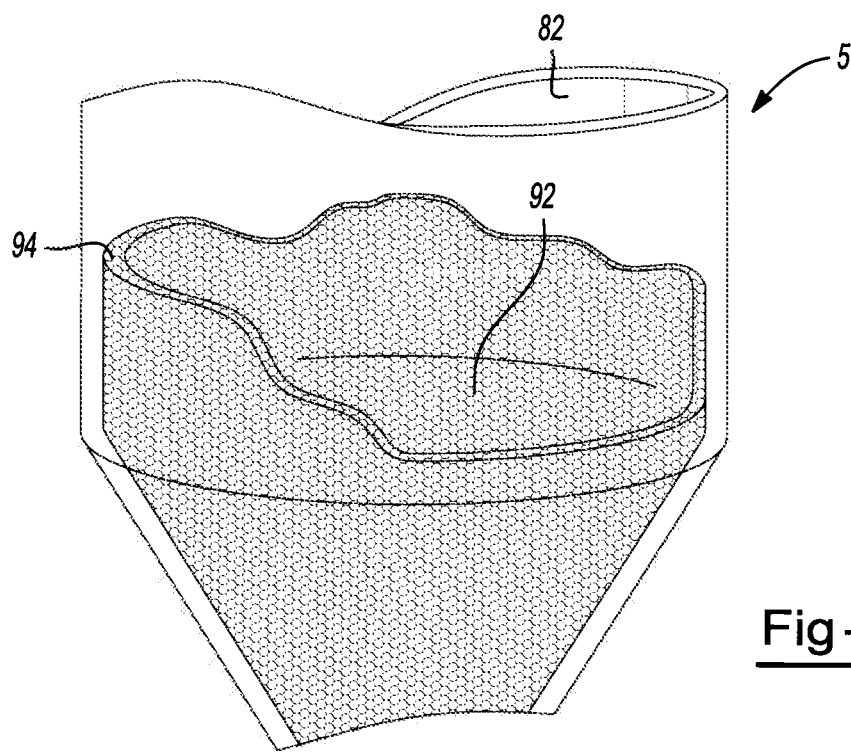
FIG. 10 shows an illustrative hopper including particles having a static charge.

The conditions of Example 6 are repeated using a conveying tube made of an electrically insulating thermoplastic and not containing a copper wire or other means of electrical conduction. Only polypropylene particles which do not contain antistat are conveyed and fed into the hopper. As illustrated in FIG. 10, polypropylene particles are stuck to the inside walls 82 of the hopper 5. The height of the polypropylene is higher near the inside wall 94 than near the center region 92.

Example 8

The conditions of Example 7 are repeated except using a blend of a first material which contain antistat and a second material which does not contain antistat. It is expected that the concentration of the second material is relatively higher near the walls 82 of the hopper and relatively low near the center region 90.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

As used herein the terms "polymer" and "polymerization" are generic, and can include either or both of the more specific cases of "homo-" and copolymer" and "homo- and copolymerization", respectively.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A process for manufacturing a shaped article, comprising the steps of:
    a) dry blending a plurality of different particulated ingredients in a blender to form a uniform particle blend;
    b) conveying the uniform particle blend from the blender to a part shaping machine having a discharge unit;
    c) reblending and substantially preventing segregation of the particle blend by flowing the blend through the discharge unit wherein the discharge unit has an outer structure and an insert, wherein the insert results in a flow of the uniform particle blend inside the insert and a flow of the uniform particle blend outside the insert, wherein the flow inside the insert is characterized by mass flow and the flow outside of the insert is characterized by mass flow;
    (d) introducing the reblended particle blend into a screw and barrel assembly of a part shaping machine;
    (e) melt blending the particulated ingredients in the screw and barrel assembly to form a melt blend; and
    (f) shaping the melt blend in the part shaping machine to form the shaped article,
    wherein the process is free of a step of melt blending the plurality of different particulated ingredients between the dry blending step and the step of introducing the reblended particle blend into the screw and barrel assembly, and the shaped article has a mess greater than about 1 g.

2. The process of claim 1, wherein the plurality of different particulated ingredients include:
    a first material that includes as first polyolefin;
    a second material including an admixture of a particulated filler and a second polyolefin; and
    a third material that includes an elastomer, wherein the elastomer is a thermoplastic having a melting temperature or a glass transition temperature greater than about 40° C.

3. The process of claim 2, wherein at least one of the first, second, or third materials further includes
    i) an additive for reducing the aggregation of substantially like particles;
    ii) an antistat compound for reducing buildup of material along the wall of the discharge unit, reducing inherent segregation of particles, or both; or
    iii) both i) and ii).

4. The process of claim 2, wherein at least one of the first, second, or third materials includes en antistat compound that is hygroscopic.

5. The process of claim 2, wherein at least one of the first, second, or third materials includes an antistat compound selected from the group consisting of a monoglyceride, an ethoxylated fatty acid amine, and a diethanolamide, wherein the concentration of the antistat compound is less than about 5% based on the total weight of the antistat containing material.

6. The process of claim 1, wherein the discharge unit includes an outer structure having an inwardly and downwardly sloping interior surface forming a first angle with the vertical and the insert includes an inner structure supported within the outer structure and having an inwardly and downwardly sloping exterior surface forming a second angle with the vertical which is smaller than the first angle, and wherein the first angle between an annular inwardly and downwardly sloping exterior surface of the outer structure and the horizontal plane is greater than about 60 degrees.

7. The process of claim 6, wherein the inwardly and downwardly sloping exterior surface of the outer structure extends to a first opening generally located at the bottom of the outer structure for discharging a first portion of the particle blend, and the inwardly and downwardly sloping exterior surface of the inner structure extends to a second opening generally located at the bottom of the inner structure discharging a second portion of the particle blend.

8. The process of claim 1, wherein at a horizontal plane through the discharge unit, a first average vertical mass flux, F1, is formed between the interior surface of the outer structure and the exterior surface of the inner structure, and a second average vertical mass flux, F2, is formed between the internal surface of the inner structure, wherein the ratio of F1 and F2 is from about 0.1 to about 10; and wherein the discharge unit feeds into a screw and barrel assembly.

9. The process of claim 6, wherein the insert includes a plurality of fins attached to the inner surface of the inner structure for defining the second mass flow that includes at least two regions within the insert having different mass fluxes wherein the two regions are on the same horizontal plane.

10. The process of claim 1, wherein the insert further includes a central structure configured to permit a central mass flow rate therethrough, the central structure longitudinally extending downward within the insert and having a generally constant transverse cross-section.

11. The process of claim 6, wherein the inwardly and downwardly sloping interior surface of the discharge unit, the inwardly and downwardly sloping exterior surface of the insert, or both is a cone having a frustoconical closed annular structure, a polyhedron having converging walls, or a combination of both.

12. The process of claim 1, further comprising a step of controlling a slide-gate, having a valve insert for preventing one or more of the first, second, and third materials from becoming accumulated in the slide-gate prior to the step of feeding to the blender wherein the valve insert is wedge-shaped or curve-shaped.

13. The process of claim 1, wherein the conveying step includes:
i) conveying the uniform particle blend through a generally closed tube having an exit opening at the reception area of the discharge unit, wherein the angle between the mean flow direction of the particle blend at the exit opening and the downward vertical direction is less than about 30°;
ii) passing the uniform particle blend through a distributor at the reception area of the discharge unit, wherein the distributor changes the average velocity of the uniform particle blend, the standard deviation of the velocity, or both; or
iii) both (i) and (ii).

14. The process of claim 1, wherein the blender is a gravimetric mixer, the part shaping machine is an injection molding machine, or both.

15. The process of claim 1, wherein the feeding to the shaping machine step includes a step of passing the uniform particle blend through a static mixer.

16. The process of claim 1, wherein
the uniform particle blend comprises a first material including a first thermoplastic, a second material including an admixture of a particulated filler and a second thermoplastic;
the first thermoplastic includes an elastomer, a polyolefin, or both; the second thermoplastic includes an elastomer, a polyolefin, or both;
the first material is present at a concentration from about 30 to about 90 parts by weight, and the second material is present at a concentration from about 10 to about 50 parts by weight based on the total weight of the uniform particle blend; and
the uniform particle blend includes a total elastomer concentration greater than about 3 wt. % and a total polyolefin concentration greater than about 30 wt. % based on the total weight of the uniform particle blend.

17. The process of claim 1 wherein the process further includes the steps of:
a) individually feeding, from at least one supply source each to a blender:
i) about 30 to about 90 parts by weight of a first material that includes a first polyolefin;
ii) up to about 50 parts by weight a second material including an admixture of a particulated filler, a second polyolefin, and an antistat agent having a glycerol monostearate, an ethoxylated fatty acid amine, a diethanolamides, or any combination thereof; and
iii) about 3 to about 40 parts by weight of a third material that includes an elastomer;
b) controlling at least one slide-gate, having a wedge-shaped valve insert configured for preventing one or more of the first, second, and third materials from accumulating in the at least one slide gate prior to being received by the blender; and
c) conveying the uniform particle blend from the blender to a part shaping machine;
wherein the blending step includes blending a plurality of particles of the first, second and third materials to form a uniform particle blend in the blender;
wherein the discharge unit includes an outer cone having a frustoconical closed annular inwardly and downwardly sloping interior surface forming a first angle with the vertical and the insert includes an inner cone coaxially supported within the outer cone and having a closed annular inwardly and downwardly sloping exterior surface forming a second angle with the vertical which is smaller than the first angle; and
wherein the inwardly and downwardly sloping exterior surface of the outer cone extends to a first opening generally located at the bottom of the outer cone for discharging the first, second, and third materials, and the inwardly and downwardly sloping exterior surface of the inner cone extends to a second opening generally located at the bottom of the inner cone discharging the first, second, and third materials, the first and second openings being position substantially common or non-common, with respect to one another.

18. The process of claim 1, wherein the different particulated ingredients are in the form of pellets.

* * * * *